United States Patent
Meyer

(10) Patent No.: US 8,251,353 B2
(45) Date of Patent: Aug. 28, 2012

(54) DEVICE FOR FIXING A PERFORATED AERATION MEMBRANE

(75) Inventor: Udo Meyer, Baden (AT)

(73) Assignee: Aquaconsult Anlagenbau GmbH, Baden (AT)

( * ) Notice: Subject to any disclaimer, the term of this patent is extended or adjusted under 35 U.S.C. 154(b) by 910 days.

(21) Appl. No.: 11/596,520

(22) PCT Filed: May 4, 2005

(86) PCT No.: PCT/AT2005/000155
§ 371 (c)(1),
(2), (4) Date: Jul. 2, 2009

(87) PCT Pub. No.: WO2005/115929
PCT Pub. Date: Dec. 8, 2005

(65) Prior Publication Data
US 2009/0301952 A1    Dec. 10, 2009

(30) Foreign Application Priority Data

May 28, 2004 (AT) ................................. A 936/2004

(51) Int. Cl.
*B01F 3/04* (2006.01)
(52) U.S. Cl. .................................................. 261/122.1
(58) Field of Classification Search ............... 261/122.1, 261/122.2, DIG. 70
See application file for complete search history.

(56) References Cited

U.S. PATENT DOCUMENTS

| 2,815,943 | A |   | 12/1957 | Lamb et al. |
| 2,978,234 | A |   | 4/1961 | Lamb |
| 4,631,134 | A | * | 12/1986 | Schussler ........................ 210/758 |
| 5,015,421 | A | * | 5/1991 | Messner ....................... 261/122.1 |
| 5,098,581 | A | * | 3/1992 | Roediger ........................ 210/758 |
| 5,681,509 | A |   | 10/1997 | Bailey |
| 6,145,817 | A | * | 11/2000 | Jager et al. .................. 261/122.2 |
| 6,345,812 | B1 | * | 2/2002 | Jager et al. .................. 261/122.1 |
| 6,406,005 | B1 | * | 6/2002 | Lawson et al. .............. 261/122.1 |
| 6,811,148 | B2 | * | 11/2004 | Frankel et al. ............... 261/122.1 |
| 7,255,333 | B2 | * | 8/2007 | Casper et al. ............... 261/122.1 |
| 7,311,299 | B2 | * | 12/2007 | Sasajima .................... 261/122.1 |
| 2011/0057334 | A1 | * | 3/2011 | Doppler ........................ 261/64.1 |

FOREIGN PATENT DOCUMENTS

| DE | 34 41 731 A1 | 5/1986 |
| DE | 41 04 287 A1 | 8/1992 |
| JP | 2001-504754 | 4/2001 |
| WO | 2004/014532 A1 | 2/2004 |

OTHER PUBLICATIONS

Office Action dated Jul. 5, 2011 for corresponding Japanese Application No. 2007-513589 with English translation.
espacenet English abstract of JP 2001-504754, Apr. 2001.

* cited by examiner

*Primary Examiner* — Charles Bushey
(74) *Attorney, Agent, or Firm* — Ladas & Parry LLP

(57) ABSTRACT

An arrangement for introducing gas bubbles into a liquid, a device for fastening a perforated aeration membrane to an aerator base plate, and an aerator base plate therefor. The aerator base plate has an undercut groove in at least one rim region thereof, into which a locking body clamping the membrane in the groove fits clampingly. The locking body has a generally circular cross-section. The groove has an at least substantially oval cross-section. The locking body is designed to be generally cylindrical.

24 Claims, 2 Drawing Sheets

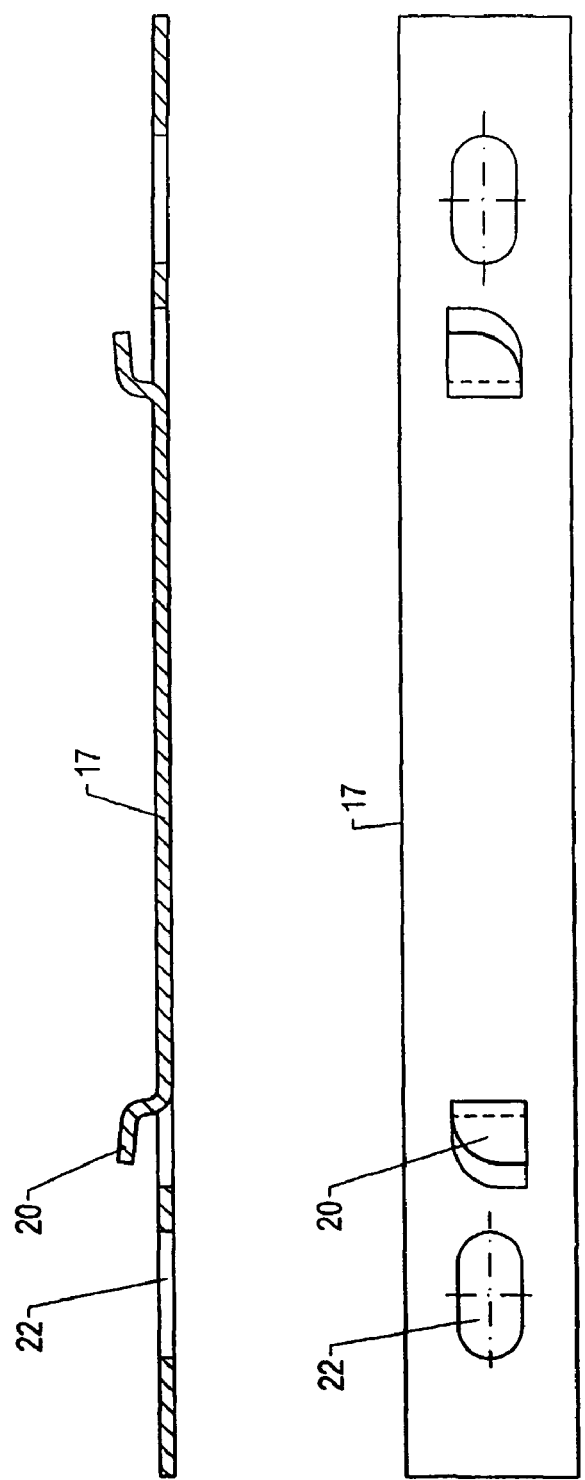

DEVICE FOR FIXING A PERFORATED AERATION MEMBRANE

The invention relates to a device for fastening a perforated aeration membrane to an aerator base plate that has an undercut groove in at least one rim region into which a locking body clamping the membrane in said groove and having a generally circular cross-section fits clampingly.

The invention also relates to an arrangement for introducing gas bubbles into a liquid, comprising an aerator base plate and a perforated membrane fastened thereto provided above said base plate.

Furthermore, the invention relates to an aerator base plate therefor.

For biologically cleaning waste water, the aerobic process has proved to be successful, in which arrangements for introducing gas bubbles into a liquid are positioned on the bottom of a clarification bed. These arrangements comprise a perforated membrane arranged above a plate-shaped base body, wherein the gas, in particular air, to be introduced into the waste water is supplied into the space between the base body and the membrane. From there, the gas can get through the perforations provided in the membrane in the form of bubbles evenly distributed into the waste water in the clarifier.

EP 0 359 698 B1 discloses a plate-shaped gas distributor for aerating water with fine bubbles. Such distributors commonly are also termed "aerators" or "plate aerators", irrespective of whether air or another gas is introduced into the liquid. The rims of a rubber-elastical, perforated gas- or air-distributing membrane are clamped in the rim region of a plate-type base body in a gas-tight manner. According to one embodiment, the membrane is fixed in a clamping manner in grooves at the narrow sides of the base plate, for which purpose ledges having integrally mounted round beads are used, which retain the membrane rims in the groove. However, this way of fastening the membrane is not satisfactory, since the ledges with the round beads are relatively complex both to produce and to install, maintenance work or an exchange of the membrane being rendered difficult.

From WO 98/21151 A1, moreover, a device is known in which the membrane, by means of integral beads, is mounted in grooves adjacent to the longitudinal rims of the base plate. Here, too, the grooves are circular in cross-section, and the beads of the membrane may have the form of hollow sealing and clamping beads. In this case, it is primarily disadvantageous that the membrane which as such already requires great care in terms of material selection and production with regard to providing the perforations, becomes additionally more complicated and expensive in its production, apart from the fact that a secure, tight retention of the membrane on the aerator plate is not ensured.

In other known devices, the membrane is glued to the base plate or connected thereto by vulcanizing. These options of fastening the membrane have, however, not been successful because maintenance work is adversely affected.

It has repeatedly been shown that, also at an increased gas pressure, the gas-proof, tight connection between membrane and aerator base plate during operation is critical. In many cases, pressurization of the membrane easily causes an unintentional detachment of the membrane from the base plate. On the other hand, the fastening constructions often are complex and expensive, so that not only production and installation but also maintenance is time-consuming and expensive.

It is now an object of the invention to eliminate these problems and to provide an improved fastening technique, by means of which the membrane shall be easily fastened and shall durably withstand a pressurization. Moreover, the device shall be easy to handle, and exchanging the membrane for maintenance work shall be easily carried out. Furthermore, the production and installation shall require as little expenditures as possible and involve the lowest costs possible.

With the present device, this object is achieved according to the invention in that the groove has an at least substantially oval cross-section and the locking body is designed to be generally cylindrical, the groove wall and/or the locking body being elastically deformable. The special design of the groove results in an improved combined positive and non-positive locking engagement for the connection of the membrane with the aerator base plate with the aid of the locking body. When the simple locking body which is inexpensive to produce and which has a cylindrical shape snaps into the elliptical groove, the locking body preferably adapts to the shape of the groove, resulting in a good clamping fit. When pressure is applied to the membrane, tension is exerted on the locking body, with the tensile stress being optimally distributed so that the membrane will durably and securely be held in a clamping fit. The aerator base plate with a groove of substantially oval cross-section is, moreover, also simple and inexpensive to produce. Furthermore, it is favorable that no special measures are required on the membrane, whereby also the costs of the membrane can be kept low.

The positive and non-positive engagement connection of the membrane with the aerator base plate can particularly advantageously be achieved if the locking body is formed by a cylindrical tube. The tube may be a rigid tube, in which case the groove walls will be elastically deformable, yet preferably the tube is elastically compressible.

The material for the locking body may be chosen as desired, wherein a synthetic material, e.g. polyethylene, appears to be most suitable, particularly if the locking body is elastically flexible or is elastically deformable.

For easy mounting and dismounting, e.g. for possible maintenance work, it is advantageous if the groove of at least substantially oval cross-section is open towards the upper side of the base plate and extends with its longer cross-sectional axis towards this upper side. In this way, the groove is readily accessible (from the top), and the insertion of the membrane as well as pressing the locking body into the groove can be effected in a simple way.

According to a preferred feature of the invention, it is suitable if the groove externally, on the outer rim of the base plate, is delimited by a web wall which projects upwards when in the operating position. In this respect, it is particularly suitable if the web wall is elastically deflectable. Thereby, the web wall may be used as a hold when detaching the membrane, by elastically deflecting it outwards, whereby the groove opening is widened for taking the locking body out of the groove. In addition, the web wall may also assume the function of a protective side wall.

With regard to a secure clamping, it is preferred that the web wall has an inwardly directed, bead-like thickened portion which defines the undercut portion of the groove on the outer side of the groove. For example, except for the bead-like thickened portion, the web wall largely has a uniform wall thickness, this being particularly suitable in view of a simpler production from a synthetic material.

For mounting it is also advantageous if the bottom of the groove of at least substantially oval cross-section, on the outer rim of the base plate is adjoined by a foot web.

Preferably, the foot web and the web wall may merge into each other by forming a uniform, in particular plane, outer surface. This will result in a particularly compact shape of the base plate and, thus, of the aerator, and, moreover, the foot web and the web wall will then together form a carrying and handling portion, wherein by pressing the foot web inwards, a release of the locking body from the base plate can be facilitated.

For storage and transportation purposes it is advantageous if the foot web has a stacking recess on its lower side for engagement with the upper side of the web wall of a corresponding base plate arranged therebelow. In this manner, several base plates may simply be stacked one on top of the other.

In some instances it is desirable to provide a fastening in addition to the clamping connection, which will provide the membrane with an intensified retention on the base plate. In this respect, the base plate may have an adhesive face adjacent the groove of the substantially oval cross-section for additionally gluing the membrane thereto. The adhesive face is preferably oblique to the upward direction (and inward direction).

Regarding a simple and cost-effective production, the base plate may be formed by an extruded section part as known per se.

To allow a simple gas supply, it is advantageous if the base plate is formed with an, e.g. tubular, gas supply channel with gas passage openings on the upper side thereof. Advantageously, this gas supply channel will be arranged substantially in the area of the middle of the width of the aerator base plate.

For a simple assembly of an aeration arrangement, it is also suitable to provide a fastening plate having an engagement lug to overlap a foot of the foot web. The engagement lug may also be a hook part obtained by partially cutting out and bending outwards the metal fastening plate.

An object of the invention is also an aerator base plate having a design as previously indicated and defined in claims 17 to 27.

The invention will be further explained by way of preferred exemplary embodiments illustrated in the drawings. Therein, FIG. 1 shows a sectional view of an aerator arrangement comprising a device according to the invention for fastening a membrane to an aerator base plate;

FIG. 2 shows a sectional view of a fastening plate for such a base plate; and

FIG. 3 shows a top view onto the fastening plate according to FIG. 2.

Figure 1:
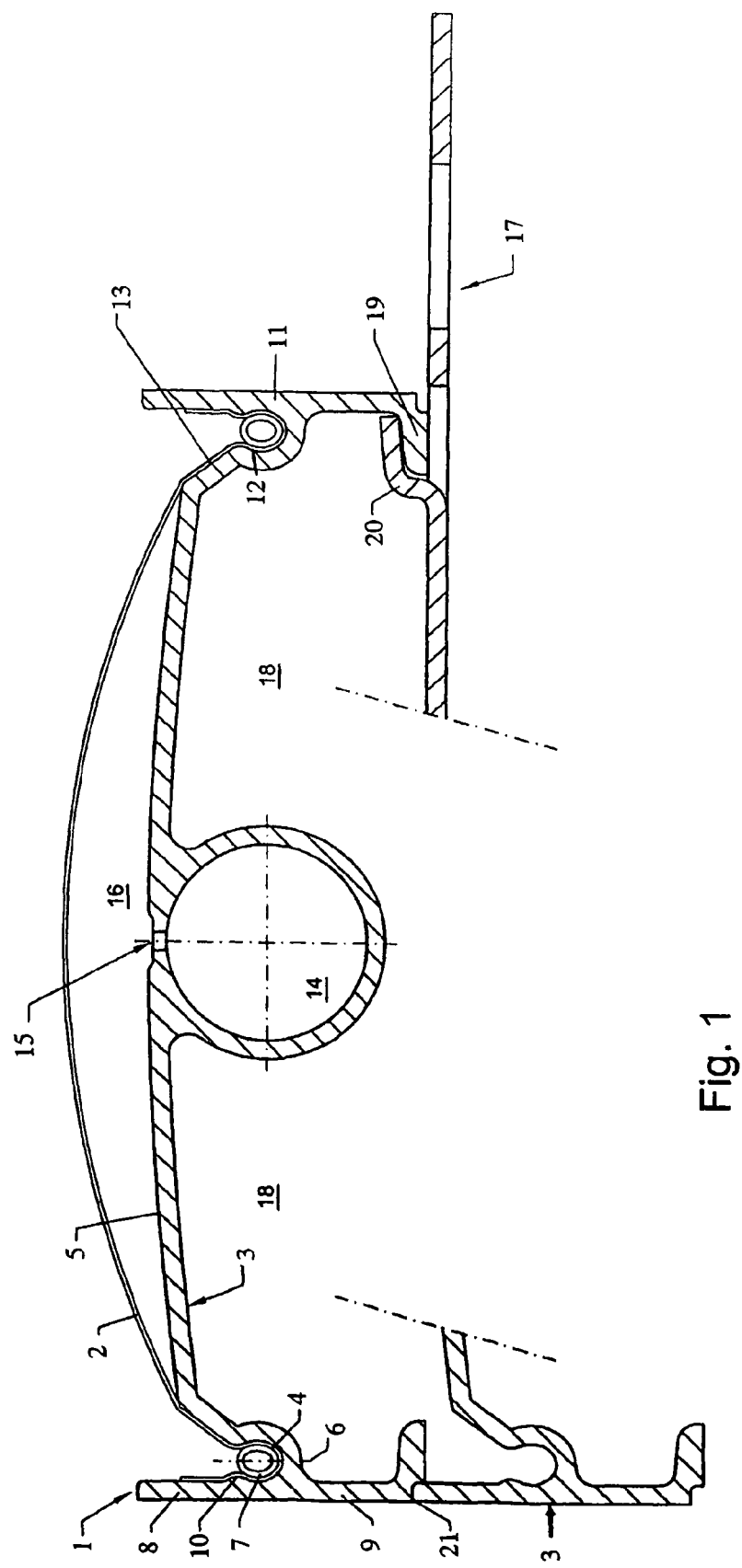

In FIG. 1, a device 1 for fastening a perforated aeration membrane 2 to an aerator base plate 3 is schematically shown in cross-section. In a manner known per se, the base plate 3 is formed by a strand section part. By way of precaution it should be mentioned that the term "base plate" 3 here is to be understood as a general and subject-oriented term and, in any event, shall not be limited to (precisely) plane structures.

In the two rim regions at the longitudinal rims of the base plate 3, one undercut groove 4 respectively is formed having a substantially oval cross-section. The groove 4 is open towards the upper side 5 of the base plate 3 and extends vertically with its longer cross-sectional axis 6, i.e. towards the upper side 5. The ratio of the lengths of the longer axis 6 to the shorter transverse axis of the cross-sectional "ellipse" of the groove 4 may, e.g., be 8:6 or 8:7, preferably 8:6.6.

The membrane 2 is tightly clamped in the groove 4 by means of a locking body 7 designed as a generally cylindrical tube (termed tube 7 in short hereinafter). The tube 7 is made of plastics, e.g., in particular polyethylene, whereby the elasticity during resilient deformation, when it snaps into the groove 4, is readily controllable.

In operation, the membrane 2 is slightly lifted off the base plate 3, and this situation is illustrated in FIG. 1. With its rim region, the membrane 2 extends from the inner side of the groove 4 beyond the outer rim of the groove 4, wherein it is shown to lie in contact with a web wall 8 that forms a boundary towards the outside. On the inner side of the web wall 8 that faces the membrane 2, an inwardly directed, bead-like thickened portion 10 is formed. It defines substantially the undercut portion of the groove 4 on the outer side of the latter. In downward direction, the web all 8 merges into a foot web 9. The web wall 8 and the foot web 9 together form a plane outer surface 11 of the aerator base plate 3.

On the upper side 5 of the aerator base plate 3, the inner side of the undercut groove 4 of substantially oval cross-section continues in a adhesive face 13 adjoining the inner undercut 12. As can be seen from the drawing, the adhesive face 13 extends upwards with an inward inclination, and it may be used for additional gluing of the membrane 2 to the base plate 3.

In the region of the middle of the width of the base plate 3, there is a tubular supply channel 14 having passage openings 15 on its upper side, which passage openings supply the space 16 between the base plate 3 and the membrane 2 with gas, in particular with air.

In order to equip a clarifier with a thus-designed arrangement for introducing gas bubbles into the waste water contained in the clarifier, several base plates 3 can be arranged in sequence as well as adjacent each other. To fix the aerator base plates 3 in the clarifier, these base plates 3 can each be arranged on a fastening plate 17 merely indicated at the right-hand side of FIG. 1. In this case, the aerator base plate 3 "stands" with its respective foot web 9 on the fastening plate 17. In the following, an example of such a fastening plate 17 will be explained in more detail by way of FIGS. 2 and 3.

The gas supply is obtained through respective connections (not shown) to the supply channels 14 of the base plates 3. In this respect, it may be provided that the supply channels 14 of several adjacent base plates have a common gas connection. For such gas connections, the spaces between the central supply channel 14 and the foot webs 9 located at the rims of the aerator base plate 3 may be utilized, it being possible to lay hoses and the like in these spaces 18 for feeding supply channels 14 of adjacent plate aerators.

The web wall 8 may be designed to be elastically deflectable so as to facilitate removal of the membrane 2 including the tube 7 from the groove 4 in the base plate 3. Such a deflection can also be assisted by pressing the foot web 9 inwards.

The foot web 9 continues in an inwardly directed foot 19. This foot 19 is retained underneath an engagement lug 20 of the fastening plate 17, cf. also FIGS. 2 and 3. The engagement lug 20 may substantially entirely overlap the foot 19.

On the lower side of the foot web 9 or of the foot 19 a stacking recess 21 is further formed on the outer side thereof. As schematically indicated in the left-hand area of FIG. 1, the stacking recess 21 accommodates the upper side of a web wall 8 of a corresponding aerator base plate 3 only partially shown in FIG. 1, arranged below the aerator base plate 3. By providing such stacking recesses 21, the present aerator base plate 3 can be stacked for storing and transporting purposes.

From FIGS. 2 and 3, the fastening plate 17 for fixedly retaining the aerator base plate 3 is shown in a sectional view and in top view, respectively. As illustrated in FIGS. 2 and 3, the fastening plate 17 has two engagement lugs 20 for receiving two feet 19 of an aerator base plate 3 (not shown in FIG. 2), the engagement lugs 20 substantially being hook parts projecting from the base plate 17, which hook parts are formed by cutting or punching out and by bending outwards.

Next to the engagement lugs 20, long-hole-type openings 22 are provided in the rim region of the fastening plate 17 for fastening the fastening plate 17 to the bottom of the respective clarifier basin. The long-hole openings 22 allow for an adjustment of the fastening plate 17 made of steel sheet or the like on the bottom of the basin.

The base plate 3 consists, e.g., of a strong synthetic material, such as, e.g., polyvinyl chloride, polyethylene, polypropylene, polycarbonate, ABS or the like, commonly used for this purpose. The membrane 2 is formed by a portion of a bendable, elastic sheet material, e.g. of a polycondensate or a polyaddition product, such as, in particular, polyurethane, EPDM, silicone, Viton, polethylene-trifluoride or polycarbonate, with a plurality of conventional perforations (not illustrated).

Instead of being tubular, the locking body 7 may also be designed with a full cross-section and made of an appropriately elastic material, such as polyurethane.

The invention claimed is:

1. A fastening device for fastening a membrane being perforated for aeration to an aerator base plate, with an aerator base plate that has an undercut groove in at least one rim region, and with at least one locking body having a generally circular cross-section, which locking body clampingly fits into said groove thereby tightly clamping the membrane, characterized in that the groove is open towards the upper side of the aerator base plate, has an at least substantially oval cross-section, and extends with its longer cross-sectional axis towards the upper side, and the groove externally, on the outer rim of the aerator base plate is delimited by a web wall which projects upwards further beyond an upper edge of an opening of the groove when in the operating position, the wall of the groove and/or the locking body being elastically deformable when pressing the locking body and the membrane in to the groove.

2. A fastening device according to claim 1, characterized in that the locking body is formed by a cylindrical tube.

3. A fastening device according to claim 1, characterized in that the locking body is made of a synthetic material.

4. A fastening device according to claim 1, characterized in that the web wall is elastically deflectable.

5. A fastening device according to claim 1, characterized in that the web wall has a thickened portion which defines the undercut portion of the groove on the outer side of the groove, the thickened portion being inwardly raised.

6. A fastening device according to claim 1, characterized in that a foot web, which stacks the aerator base plates in a biological reactor via a fastening plate, is adjoined to the bottom of the groove on the outer rim of the aerator base plate.

7. A fastening device according to claim 6, characterized in that the foot web and the web wall merge into each other by forming a uniform outer surface.

8. A fastening device according to claim 6, characterized in that the foot web has a stacking recess on its lower side for engagement with the upper side of the web wall of a corresponding base plate arranged therebelow.

9. A fastening device according to claim 1, characterized in that the aerator base plate has an oblique adhesive face adjacent to the groove for additionally gluing the membrane thereto.

10. A device according to claim 1, characterized in that the aerator base plate is formed by an extruded section part.

11. A fastening device according to claim 1, characterized in that the aerator base plate is formed with a tubular gas supply channel with gas passage openings on the upper side thereof.

12. A fastening device according claim 1, further comprising a membrane which is tightly clamped to the aerator base plate with the aid of the locking body.

13. An air diffuser for introducing gas bubbles into a liquid, comprising an aerator base plate, a membrane being perforated for aeration, and a fastening device for fastening the membrane to the aerator base plate, the fastening device comprising an aerator base plate that has an undercut groove in at least one rim region, the fastening device further comprising at least one locking body having a generally circular cross-section, which locking body clampingly fits into said groove thereby tightly clamping the membrane, wherein the groove is open towards the upper side of the aerator base plate, has an at least substantially oval cross-section, and extends with its longer cross-sectional axis towards the upper side, and the groove externally, on the outer rim of the aerator base plate, is delimited by a web wall which projects upwards further beyond an upper edge of an opening of the groove when in the operating position, the wall of the groove and/or the locking body being elastically deformable when pressing the locking body and the membrane into the groove.

14. An air diffuser for introducing gas bubbles into a liquid according to claim 13, further comprising a fastening plate and a foot web, which foot web stacks the aerator base plates in a biological reactor via the fastening plate and is adjoined to the bottom of the groove on the outer rim of the aerator base plate, wherein the fastening plate has an engagement lug for overlapping a foot of the foot web.

15. An air diffuser for introducing gas bubbles into a liquid according to claim 14, characterized in that the engagement lug is a hook part obtained by partially cutting out and bending outwards the metal fastening plate, the fastening plate being made of metal.

16. An aerator base plate having an undercut groove at least in a rim region thereof for fastening a perforated membrane, characterized in that the groove is open towards the upper side of the aerator base plate, has an at least substantially oval cross-section, and extends with its longer cross-sectional axis towards the upper side, and the groove externally, on the outer rim of the aerator base plate, is delimited by a web wall which projects upwards further beyond an upper edge of an opening of the groove when in the operating position.

17. An aerator base plate according to claim, 16 characterized in that the web wall is elastically deflectable.

18. An aerator base plate according to claim 16, characterized in that the web wall has a thickened portion which defines the undercut portion of the groove on the outer side of the groove, the thickened portion being inwardly raised.

19. An aerator base plate according to claim 16, characterized in that at the outer rim of the base plate, a foot web is adjoined to the bottom of the groove.

20. An aerator base plate according to claim 19,
characterized in that the foot web and the web wall merge into each other by forming a uniform, in particular plane, outer surface.

21. An aerator base plate according to claim 19, characterized in that the foot web has a stacking recess on its lower side for engagement with the upper side of the web wall of a corresponding aerator base plate arranged therebelow, so as to be able to use it when a plurality of the aerator base plates are detached from the biological reactor and are stacked for the purpose of storing or transferring.

22. An aerator base plate according claim 16, characterized in that adjacent to the groove, the aerator base plate has an oblique adhesive face for additionally gluing the membrane (2) thereto.

23. An aerator base plate according to claim 16, characterized in that the aerator base plate is formed by an extruded section part.

24. An aerator base plate according to claim 16, characterized in that the aerator base plate (3) is formed with a tubular gas supply channel with gas passage openings on the upper side thereof.

* * * * *